F. P. LANNON, Jr.
PROCESS AND APPARATUS FOR TREATING ZINC DUST.
APPLICATION FILED SEPT. 30, 1920.
1,412,621.
Patented Apr. 11, 1922.
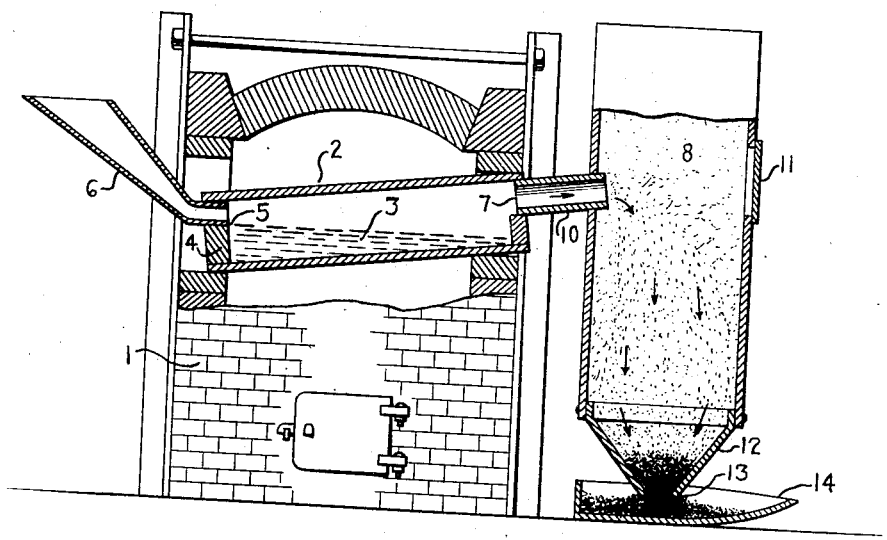
INVENTOR
Franklin P. Lannon Jr.
BY
Albert M. Austin
ATTORNEY

UNITED STATES PATENT OFFICE.

FRANKLIN P. LANNON, JR., OF SAND SPRINGS, OKLAHOMA, ASSIGNOR TO AMERICAN SMELTING AND REFINING COMPANY, OF NEW YORK, N. Y., A CORPORATION OF NEW JERSEY.

PROCESS AND APPARATUS FOR TREATING ZINC DUST.

1,412,621.  Specification of Letters Patent.  Patented Apr. 11, 1922.

Application filed September 30, 1920. Serial No. 413,820.

*To all whom it may concern:*

Be it known that I, FRANKLIN P. LANNON, Jr., a citizen of the United States, and resident of Sand Springs, (% U. S. Zinc Co.,) in the county of Tulsa and State of Oklahoma, have invented certain new and useful Improvements in Processes and Apparatus for Treating Zinc Dust, of which the following is a specification.

The invention relates in general to an improvement in the method of treating zinc bearing material for producing zinc dust generally known as blue powder and specifically relates to an improvement both in the method of treating the zinc dust after it is discharged from a zinc furnace and to an improved form of instrumentality for practicing the method.

It is a usual practice in the metallurgy of zinc to supply molten zinc, spelter and other zinc containing material to a zinc furnace wherein it is subject to a heat treatment producing metallic zinc dust or blue powder and, under some conditions, producing a condensed product such as spelter. The blue powder is usually discharged from the furnace, received into an expansion chamber in which the dust is precipitated and removed after the charge in the retort has been worked off. Any attempt to open the expansion chamber during the working of the charge in the furnace results in a flare-back with consequent loss of material due to the tendency of zinc dust to fire. The necessity for waiting for each charge to be completely smeltered, prior to the opening of the expansion chamber, with resulting cooling down of the furnace, is obviously objectionable.

Accordingly, one of the objects of the invention is to provide a simple method for actuating a retort furnace continuously, and for drawing the blue powder from time to time as desired without danger of a flare-back.

Broadly, I attain this phase of the invention by receiving the zinc dust from the retort into an expansion chamber as is usual, but I cause the dust settling in the chamber to accumulate and form a seal or trap disposed in position to close the outlet from the chamber and at the same time permit access to the accumulated dust for the purpose of removing the same from time to time and during the active operation of the furnace.

Another object of the invention is to provide for an increase in the amount of zinc dust produced, and incidental to this object the invention contemplates first the providing of conditions not favorable to the formation of spelter, and, second providing for the return to the retort of any spelter which may be formed.

This object is attained by removing from the hot zone of the expansion chamber the zinc dust formed so that it does not retain its heat thereby causing a lower temperature in the expansion chamber. This condition is favorable to the formation of zinc dust and unfavorable to the formation of spelter. Still featuring a condition favorable to the increase of zinc dust over known methods the invention further contemplates the use of such a connection between retort and expansion chamber that any spelter which may be formed is returned to the retort.

Referring to the apparatus feature of the disclosure another object of the invention is to provide a simplified form of apparatus for economically practicing the method hereinbefore outlined and to provide a simple form of attachment to a conventional form of zinc retort furnace which will insure maximum and continuous production of a high grade zinc dust with a resulting saving in material and labor costs.

In the accompanying drawing there is disclosed, mainly in vertical section, a conventional form of zinc retort furnace operatively connected to discharge into a preferred embodiment of the physical features of the invention and illustrating one means for practicing the method.

In the drawings there is shown a furnace 1 provided with a cylindrical retort 2 mounted therein in which is positioned a molten charge 3 of zinc bearing material. The rear end of the retort is normally closed by a closure 4 at the upper side of which is provided an opening 5 designed to receive the discharge end of a feed funnel 6 into which the molten zinc bearing material is adapted to be poured in charging the furnace. The upper front end of the retort is provided with a discharge opening 7 and in other respects the furnace resembles a known form of such device. An expansion chamber 8 is positioned exteriorly of the furnace and is connected to receive the dust discharged from the retort through an inclined tubular tip 10 which is so arranged that it will return to the retort any spelter which may condense therein during the operation of the retort. The chamber 8 is provided, opposite the discharge end of the tip 10, with a cleanout door 11 but there is no necessity in this disclosure of this door having the depth extending to the bottom of the chamber usual in such devices. The lower end of the chamber is provided with a hopper 12 adapted to receive the precipitated dust and the lower end of the hopper constitutes a constricted discharge outlet 13 from the expansion chamber.

A dust receiving pan 14 is positioned slightly below the discharge end of the funnel and the parts are so disposed that the precipitated dust, collecting at the opening 13, closes the opening and thus forms a sealing trap intercepting air communication between the external atmosphere and the interior of the retort through the expansion chamber. As the top of the pan 14 is wide opened ready access is provided to the outer portions of the mass of dust collecting therein and the dust can be removed from time to time without interfering with the sealing of the outlet.

It is obviously within the scope of the invention to make the pan 14 as a structural part of the chamber 8 and provide access thereto through a conveniently disposed door.

It will be understood that the removal of the zinc from the outer edge of the accumulated mass will cause the dust collected in the interior of the chamber to fall down through the outlet, but so long as there is any dust remaining in the outlet the interior of the chamber will be shut-off from the outside air.

It will be appreciated that the process is continuous, for a new charge can be introduced into the retorts as the old charge burns out and this way the temperature of the retort can be maintained at its economic constant. The possibility of forming coarse or large pieces of metallic zinc which usually form in the bottom of the chamber is eliminated.

Having thus described my invention, I claim:—

1. In the art of producing a zinc dust of the type known as blue powder, the process which consists in charging a retort with molten zinc bearing material subjecting the material to a heat treatment to vaporize the zinc in the charge, separating the zinc vapor from any spelter or liquid which may form, collecting the powder by precipitation from the vapor exteriorly of the retort, and causing said collected powder to act as a seal between the retort and the outside atmosphere.

2. In the art of producing blue powder, the process which consists in charging a retort with zinc bearing material, vaporizing the zinc in the charge, collecting the powder from the resulting vapor, causing said collected powder to act as a seal between the retort and the outside and removing portions of the collected dust while permitting other portions to continue to form the seal.

3. In an apparatus for treating zinc to form zinc dust, the combination with a zinc retort, a conduit open to the discharge port of the retort and sloping back towards the retort to return thereto any condensate collected in the conduit, a receptacle for receiving zinc dust and a zinc dust collector depending from the conduit and extending into the receptacle and terminating above the bottom thereof to form a trap.

4. In an apparatus for treating zinc, the combination with a retort, a tip open to the discharge port of the retort and sloping back towards the retort to return thereto any spelter condensed in the tip, a pan for receiving zinc dust and a zinc dust conduit depending from the tip, extending into the pan and terminating above the bottom thereof to form a trap, said pan provided with means independent of the conduit for permitting access to the pan thereby to remove the zinc dust at will without interruption to the functioning of the apparatus.

5. In a device of the class described, the combination with a zinc retort, of means for forming a trap open to the discharge port of the retort to receive the blue powder discharged therefrom, and permitting access to the blue powder collected in the trap.

6. In a zinc furnace, the combination with a retort, an expansion chamber open to said retort to receive the zinc dust therefrom, said chamber provided with a discharge outlet, of means associated with said outlet for receiving the dust discharged therefrom and coacting therewith to cause the dust to close the outlet.

7. In a zinc furnace, the combination with a retort, an expansion chamber open to said retort to receive the zinc dust therefrom, said chamber provided with a discharge outlet adjacent its lower end, of means associated with said outlet for receiving the dust discharged therefrom and coacting therewith to cause the dust to close the outlet.

8. In a zinc furnace, the combination with a retort, an expansion chamber open to said retort to receive the zinc dust therefrom, a funnel depending from the lower end of the chamber, and an open top pan disposed below said funnel.

9. In a device of the class described, the combination with a zinc retort and expansion chamber having a discharge outlet, of means coacting with the discharge outlet of the chamber for forming a trap operatively disposed to receive the blue powder discharged from the retort, said trap permitting access to the blue powder collected in the trap.

Signed at Sand Springs in the county of Tulsa and State of Oklahoma this thirteenth day of Sept. A. D. 1920.

FRANKLIN P. LANNON, JR.